(12) United States Patent
Evanitsky et al.

(10) Patent No.: US 9,530,310 B2
(45) Date of Patent: Dec. 27, 2016

(54) METHOD AND SYSTEM FOR DETECTING AND TRACKING A VEHICLE OF INTEREST UTILIZING A NETWORK OF TRAFFIC IMAGE-CAPTURING UNITS

(71) Applicant: Xerox Corporation, Norwalk, CT (US)

(72) Inventors: Eugene Evanitsky, Pittsford, NY (US); Joseph Martin St. Germaine, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 250 days.

(21) Appl. No.: 14/069,519

(22) Filed: Nov. 1, 2013

(65) Prior Publication Data

US 2015/0124099 A1    May 7, 2015

(51) Int. Cl.
*H04N 7/18* (2006.01)
*G08G 1/017* (2006.01)
*G06K 9/00* (2006.01)
*G08G 1/00* (2006.01)

(52) U.S. Cl.
CPC ......... *G08G 1/0175* (2013.01); *G06K 9/00785* (2013.01); *G08G 1/205* (2013.01)

(58) Field of Classification Search
CPC .................... G06K 2209/15; G06K 9/00791
USPC ....................................................... 348/149
See application file for complete search history.

(56) References Cited

U.S. PATENT DOCUMENTS

| 4,839,648 A * | 6/1989 | Beucher ................... G08G 1/04 340/933 |
| 8,447,112 B2 | 5/2013 | Paul et al. |
| 8,483,440 B2 | 7/2013 | Fan et al. |
| 2002/0140577 A1 | 10/2002 | Kavner |
| 2004/0222904 A1* | 11/2004 | Ciolli ..................... G08G 1/052 340/937 |
| 2005/0029347 A1 | 2/2005 | Noble et al. |

(Continued)

FOREIGN PATENT DOCUMENTS

| EP | 1 085 456 B1 | 11/2006 |
| EP | 2 088 568 A2 | 8/2009 |

(Continued)

OTHER PUBLICATIONS

U.S. Appl. No. 14/054,998, filed Oct. 16, 2013, Rodriguez Serrano et al.

*Primary Examiner* — Jamie Atala
*Assistant Examiner* — Masum Billah
(74) *Attorney, Agent, or Firm* — Kermit D. Lopez; Luis M. Ortiz; Ortiz & Lopez, PLLC

(57) ABSTRACT

Methods and systems for detecting a vehicle of interest utilizing one or more traffic image-capturing units and a centralized server. A request from an authority to detect a vehicle of interest with respect to an incident can be verified based on particular criteria. One or more of the image-capturing units can be selected along with location information stored in a database in order to enable a search. A notification can be sent to the authority upon identification of the vehicle of interest by the image-capturing unit(s). An area or radius of search can be calculated to alert one or more other image-capturing units for use in tracking the vehicle of interest. Data regarding the vehicle of interest can then be transmitted to an incident management module to dynamically update details regarding detection of the vehicle of interest.

20 Claims, 4 Drawing Sheets

(56) References Cited

U.S. PATENT DOCUMENTS

| | | | |
|---|---|---|---|
| 2006/0043188 A1* | 3/2006 | Kricorissian | G06K 9/00993 235/462.08 |
| 2006/0278705 A1* | 12/2006 | Hedley | G07B 15/063 235/384 |
| 2011/0194733 A1 | 8/2011 | Wilson | |
| 2013/0028481 A1 | 1/2013 | Wu | |
| 2013/0076906 A1* | 3/2013 | Rothschild | G08G 1/00 348/148 |
| 2013/0088597 A1 | 4/2013 | Kadoch et al. | |
| 2013/0129151 A1 | 5/2013 | Rodriguez Serrano et al. | |

FOREIGN PATENT DOCUMENTS

| | | |
|---|---|---|
| EP | 2 336 980 A1 | 6/2011 |
| EP | 1 897 065 81 | 10/2012 |
| EP | 1 428 378 81 | 3/2013 |
| EP | 2 595 092 A2 | 5/2013 |

\* cited by examiner

METHOD AND SYSTEM FOR DETECTING AND TRACKING A VEHICLE OF INTEREST UTILIZING A NETWORK OF TRAFFIC IMAGE-CAPTURING UNITS

FIELD OF THE INVENTION

Embodiments are generally related to the field of vehicle identification, detection, and tracking. Embodiments are also related to traffic image-capturing units and systems thereof. Embodiments are additionally related to the detection and tracking of a vehicle with respect to a particular incident.

BACKGROUND

Many crimes are performed utilizing vehicles, which in some cases may be stolen or otherwise illegally obtained and operated. In other cases, the vehicles are legally owned, but the vehicle owner or people associated with the vehicle may perpetrate a crime such as a robbery abduction. The detection of such a vehicle can consume a great deal of law enforcement resources. The successful detection of a vehicle of interest can potentially reduce traffic-related injuries and deaths while providing preemptive curbing of illegal activities. The ultimate goal is to apprehend the person who is associated with the vehicle, i.e., the person who committed the crime.

The majority of conventional approaches to detecting a vehicle of interest involve the use of a license plate scanner that captures vehicle information along with location and time data. This information can be processed to address particular incidents such as solving crimes. Captured license plate images can be checked against a database of vehicles that are of potential interest. Such an approach, however, requires a great deal of processing and is time consuming since it relies on ad hoc data.

Based on the foregoing, it is believed that a need exists for an improved method and system for detecting a vehicle of interest utilizing a traffic image-capturing unit, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved vehicle identification, detection, and tracking methods and systems.

It is another aspect of the disclosed embodiments to provide for an improved method and system for detecting and tracking a vehicle of interest with respect to a particular incident (e.g., a crime).

It is a further aspect of the disclosed embodiments to provide for the dynamic processing of traffic image-capturing unit images for the detection and tracking of vehicles of interest and to report their location in real time to appropriate authorities (e.g., police, homeland security, etc.).

The aforementioned aspects and other objectives and advantages can now be achieved as described herein. Methods and systems for detecting and tracking a vehicle of interest utilizing a traffic image-capturing unit and a centralized server are disclosed herein. A request from an authority to detect a vehicle with respect to an incident based on particular criteria can be verified. The image-capturing unit can be selected from a set of image-capturing units along with location information stored in a database in order to enable a search. A notification can then be sent to the appropriate authorities upon spotting the vehicle of interest by the image-capturing unit.

A radius or area of search based on an initial location, an elapse time, a probable vehicle speed, and a trajectory of the vehicle can be calculated by a dynamic search area module (e.g., which stores and/or processes instructions indicative of a dynamic search area algorithm) and a trajectory processor to alert another image-capturing unit for tracking. The data of interest can be transmitted back to an incident management module to dynamically update the details. Note that one of the advantages of such an approach is to keep the number of cameras looking for the vehicle few in number to avoid loading down the system. The search radius might start out large since the location of the vehicle is not known. Once it is spotted, the number of cameras involved can be kept at a minimum.

A request service management module accepts and verifies the request to detect the vehicle of interest utilizing the vehicle images from the image-capturing unit (e.g., license plate numbers, partial license plate numbers) along with other observable data (e.g., make, model, color, damage, decals or bumper stickers). The server downloads data with respect to the vehicle of interest and selectively chooses the image-capturing unit to enable search. An image-capturing unit controller transmits commands with respect to the search result to the selected image-capturing unit and processes feedback.

The database associated with an image-capturing unit clearing house includes a fixed position, in network image-capturing unit (e.g., traffic light image-capturing unit), a fixed position, out of network image-capturing unit (e.g., security image-capturing unit, parking lot image-capturing unit, etc.) or an in and out of network mobile image-capturing unit (e.g., image-capturing units located on vehicles, etc.). The image-capturing unit performs real time lookup as the number of vehicles for any image-capturing unit at any time is relatively small. The post processing can be executed to search the image files from the captured images. It is preferred that the actual camera does as much of the work as possible in identifying the vehicle for the sake of speed. Post processing can be used to extract further information that can be passed along as part of the incident such as the name of the vehicle owner once a satisfactory serial number or other identifying information has been detected.

The dynamic search area algorithm (e.g., implemented in the context of a module) can determine the radius of search based upon a sighting and a probable path with respect to the vehicle and calculates the trajectory of the vehicle and the data can be erased upon notifying the authority. The data that is not of interest is not stored and data of interest can be transmitted back to the incident management module. The system rapidly processes the image in real time and alerts the authorities and extends current transportation related services. The system also improves image-capturing unit resolution and processing speed and increases the speed of detection and alerting mechanism.

Such an approach provides the ability to dynamically process traffic camera images to search for vehicles of interest and report their location to authorities in real time.

The data does not need to be stored at all and only specific vehicles are identified rather than collecting data regarding every vehicle photographed.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
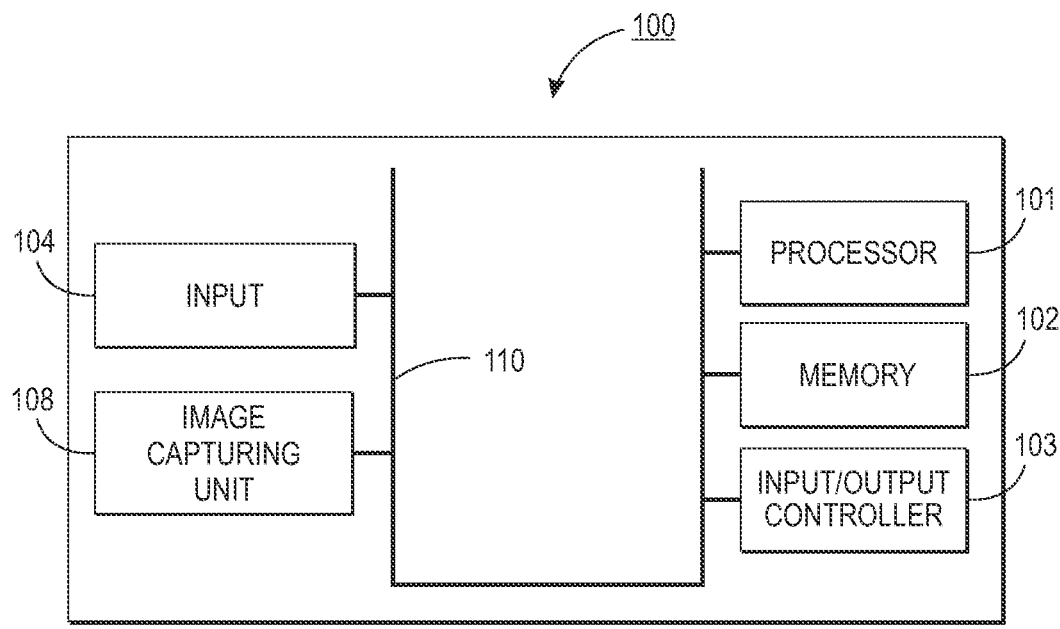
FIG. 1 illustrates a schematic view of a data-processing system, which can be implemented in accordance with an embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, embodiments can be implemented in the context of, for example, a method, data processing system, or a computer program product. Accordingly, embodiments may also take the form of an entire hardware embodiment, an entire software embodiment or an embodiment combining software and hardware aspects all generally referred to herein as a "system," "circuit" or "module." Furthermore, embodiments may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely in the camera system, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
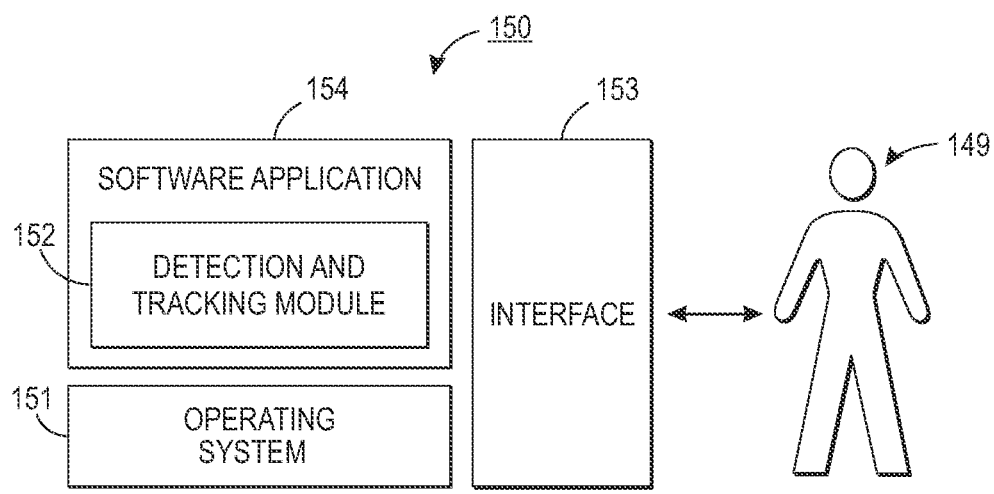
FIG. 2 illustrates a schematic view of a software system including a vehicle of interest detection and tracking module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a system bus 110, a processor 101 (e.g., a CPU or central processing unit), a memory 102, an input/output controller 103, an input device 104, and an image-capturing unit 108. In some embodiments, for example, a USB peripheral connection (not shown in FIG. 1) and/or other hardware components may also be in electrical communication with the system bus 110 and components thereof. As illustrated, the various components of data-processing system 100 can communicate electronically through the system bus 110 or a similar architecture. The system bus 110 may be, for example, a subsystem that transfers data between, for example, computer components within data-processing system 100 or to and from other data-processing devices, components, computers, etc.

Note that in some embodiments, the image-capturing unit 108 may include its own CPU to run a software program. Processor 101 functions as such CPU. The camera or image-capturing unit 108 can be capable of receiving remote commands and other data to help match images to the vehicle of interest (e.g., white 1960 Chevy Impala). In this example, the image-capturing unit 108 shown in FIG. 1 is analogous to the camera or image-capturing unit 312 shown in FIG. 3. Thus, system 100 can include the image-capture unit 108 or may communicate with the image-capturing unit via the bus 110 or other communications means (e.g., wireless network, wired components, etc.), depending on specific applications. In other embodiments, system 100 may actually be, for example, the camera 312 shown in FIG. 3. That is, the camera 312 shown in FIG. 3 may include, for example, its own processor 101, memory 102, input/output controller 103, input unit, and so forth, and includes the image-capturing unit 108.

Note that in some embodiments, the objective of the camera processor 101 can be to detect a vehicle of interest based on the details that the requestor provides. As an example, the requestor knew that the vehicle was a 2004 Volkswagen Passat, but only saw the first two digits of the license plate "D5". If the unit 312, for example, captures an image of a 2004 Passat with license plate number D592W7, it will declare a hit and send back the data. The central processor 101 can verify the image data, check the license plate number, etc., and then augment the record. Likewise, if the requestor had the whole license plate and the camera only caught the first two digits and the correct make/model, it would still declare a hit and let the CPU or processor 101 determine if it is accurate. Regarding the number of passengers, this is not necessarily a requestor option. The camera images can sometimes show the number of occupants, but cameras can rarely capture that level of detail. Regarding speed and direction, if the camera can capture it, then it can be sent to the centralized unit for determining, for example, the search radius or area (e.g., not necessarily a circle).

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc. The term module can also refer in some cases to a physical hardware component. The same holds true for the term unit utilized herein. That is, a unit may be a module (e.g., hardware module, software module) or a device such as a camera, etc.

The interface 153, which is preferably a graphical user interface (GUI), also serves to display results, whereupon the user 149 may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a detection and tracking module 152 for detecting and tracking a vehicle of interest utilizing, for example, one or more traffic image-capturing units such as, for example, camera 108 shown in FIG. 1, camera 312 shown in FIG. 3, etc. Software application 154, on the other hand, can include instructions such as the various operations described herein with respect to the various components and modules described herein such as, for example, the method 400 depicted in FIG. 5.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 3:
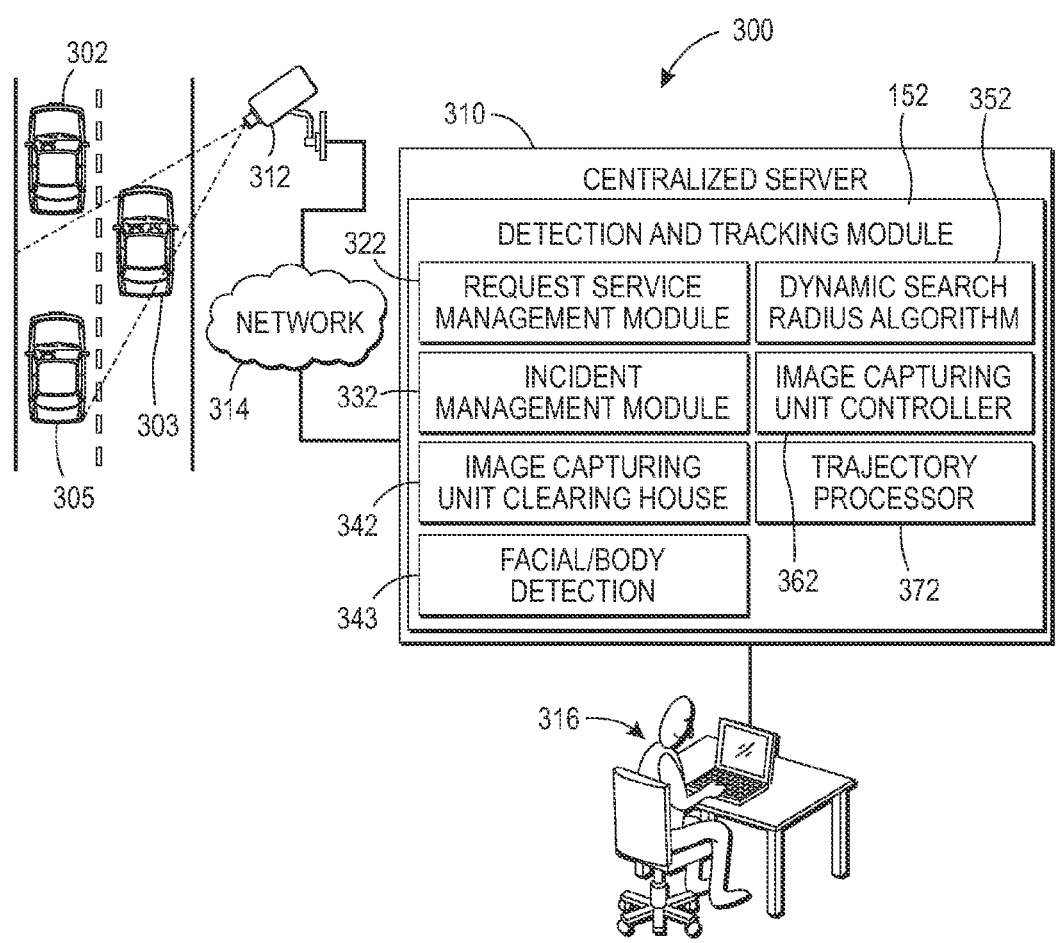
FIG. 3 illustrates a block diagram of a vehicle of interest detection system, in accordance with the disclosed embodiments.

In general, it should be noted that detection can be accomplished by a camera or image-capturing unit such as camera 108 shown in FIG. 1 or camera 312 shown in FIG. 3. This element is used by authorities to provide details of what to look for and for selecting the set of cameras to employ in the search. It can also provide feedback to the operator as detections occur and the search radius or area changes. This can also be used for processing partial detections, model of car but no view of license plate.

FIG. 3 illustrates a block diagram of a vehicle of interest detection and tracking system 300, in accordance with the disclosed embodiments. Note that in FIGS. 1-5, identical or similar blocks are generally indicated by identical reference numerals. System 300 generally includes a centralized server 310 configured with a detection and tracking module 152 to search specific vehicles such as, for example, vehicles 302, 303, and/or 305 based on particular criteria. Authorization in this context can utilize existing authorization mechanisms that are in place today for searching for vehicles. It is important to appreciate, however, that in a preferred embodiment only authorized individuals can access this system.

The detection and tracking module 152 can further include a request service management module 322, an incident management module 332, an image-capturing unit clearing house 342, a dynamic search area module 352, an image-capturing unit controller 362, and a trajectory processor 372. For example, the image-capturing unit 312 (e.g., camera) associated with the centralized server 310 can capture an image of the vehicle 302 within an effective field of view. The detection and tracking module 152 can also be configured to include a facial and/or body detection module 343. That is, in some embodiments, the disclosed approach can be utilized for tracking people with facial recognition software and/or body recognition software. For example, such a module 343 can analyze image data captured of passengers in one or more of the vehicles 302, 303, 305, etc., for use in detecting and tracking individuals associated with one or more of the vehicles 302, 303, 305. License plate photo data contained in, for example, the image capturing unit clearing house 342 may be analyzed and compared against facial data collected by camera 312 with respect to one or more of the vehicles 302, 303, 305.

One or more vehicles 302, 303, and/or 305 may be, for example, automobiles, cars, trucks, vans, buses, motor homes, tankers, motorcycles, or other vehicles, etc., as well as trailers of all kinds in-tow. The image-capturing unit 312 can be operatively connected to the centralized server 310 via a network 314. Note that the image-capturing unit 312 described in greater detail herein are analogous or similar to the image-capturing unit 108 of the data-processing system 100, depicted in FIG. 1. The image-capturing unit 312 may include built-in integrated functions such as image processing and recognition, data formatting, and data compression functions. Also, the unit 312 includes imager-positioning, range-finding, and a flash bulb.

Note that the network 314 may employ any network topology, transmission medium, or network protocol. The network 314 may include connections such as wire, wireless communication links, or fiber optic cables. Network 314 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The request service management module 322 verifies a request from an authority 316 (e.g., a police dispatcher) to detect a vehicle such as vehicle 302, 303, and/or 305 based on several criteria with respect to an incident. The incident may be, for example, a crime carried out utilizing a vehicle. The incident management module 332 maintains and dynamically updates information with respect to the incident. The image-capturing unit clearing house 342 can be configured to include a database of a set of image-capturing units along with the location. The image-capturing unit 312 can be selected from the set of image-capturing units in order to enable a search.

The image-capturing unit controller 362 transmits commands with respect to the search result to the selected image-capturing unit 312 and processes feedback. The dynamic search area module 352 can calculate an area and/or radius of search 354 based on initial location, elapse time, probable vehicle speed, and the trajectory processor 372 alerts another image-capturing unit for tracking. The data of interest can be transmitted back to the incident management module 332 to dynamically update the details. A notification can be sent to the authority 316 upon spotting the vehicle of interest 302 by the image-capturing unit 312.

Figure 4:
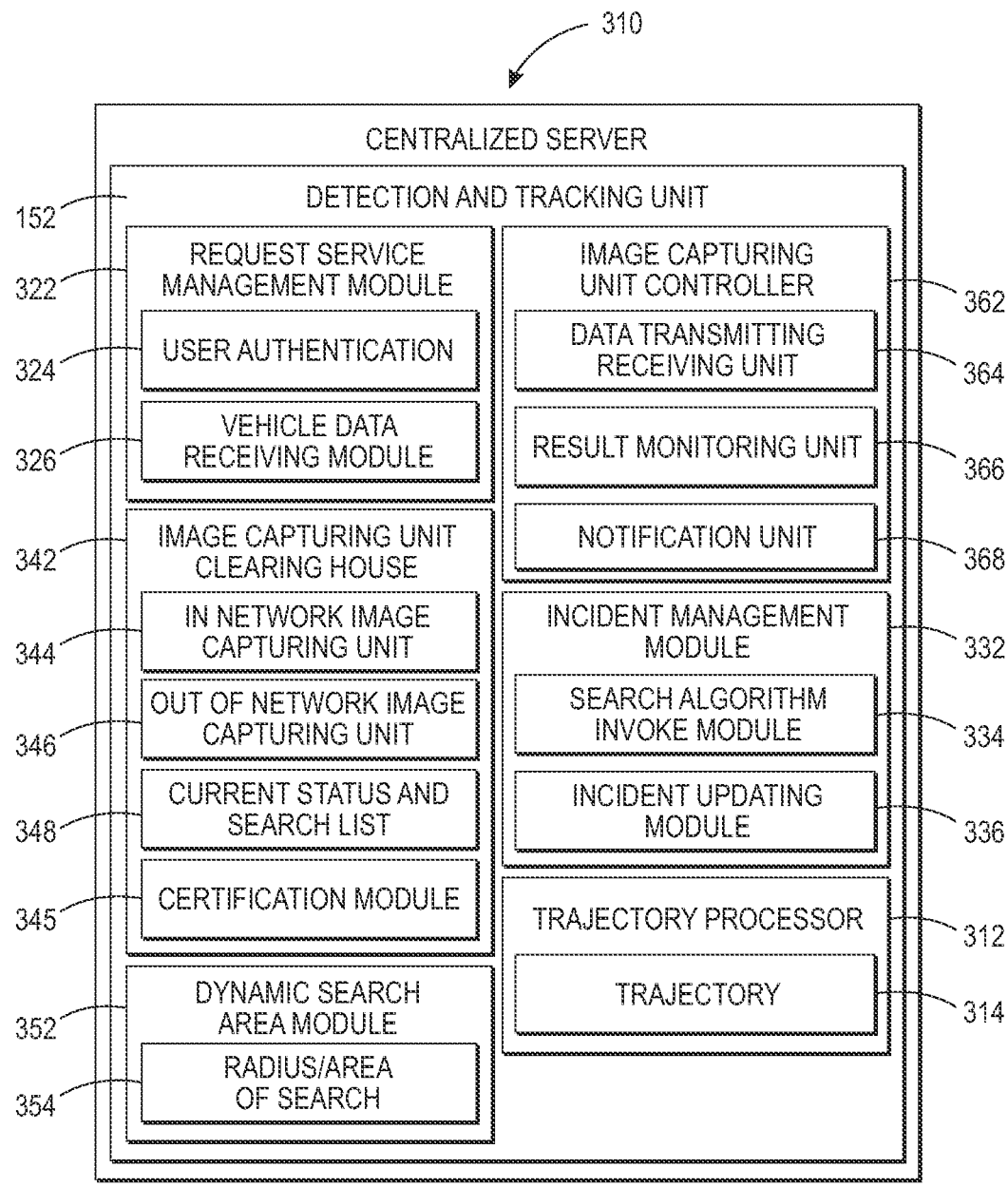
FIG. 4 illustrates a block diagram of a centralized server associated with the vehicle of interest detection system, in accordance with the disclosed embodiments.

FIG. 4 illustrates a block diagram of the centralized server 310 associated with the detection and tracking system 300, in accordance with an embodiment. The request service management module 322 can include an authentication module 324 to authenticate the authority 316. A vehicle data receiving module 326 accepts and verifies the request from the authority 316 for detecting the vehicle of interest 302 identified by several different methods, for example, license plate numbers, partial license plate numbers along with other observable details (e.g., make, model, color, damage, decals or bumper stickers).

The incident management module 332 keeps track of requests and maintains details of the incident. A search algorithm invoke module 334 and an incident-updating module 336 can dynamically update details as more information is gathered. A requester can convey what he or she wants to be collected about a target of interest (e.g., full license plate, number of passengers, inferred vehicle speed, etc.). In one example scenario, if a requestor describes the make and model of the vehicle and the fact that it had a broken windshield and indicates the first two digits of the license plate, the vehicle can be detected based on this data and updated information generated such as, for example, a complete license plate number, known vehicle spotting information, image-capturing units enlisted in the search, etc. Note that the image capturing unit controller 362 in association with a camera or image-capturing unit (e.g., camera 312 shown in FIG. 3) can detect targets of interest. The incident management module 332 can supplement known information regarding a target such as, for example, a license plate number.

The image-capturing unit clearing house 342 can function as a database that includes, for example, data indicative of all image-capturing units that are available and capable for the search and which have been engaged. Examples of information contained in the clearing house 342 include, for example, a fixed position in-network image-capturing unit(s) 344 (e.g., one or more traffic light image-capturing units), out of network imaging-capturing units 346 (e.g., security image-capturing unit, parking lot image-capturing unit, etc.) along with a current status and search list 348. In some embodiments, an in and out of network mobile image-capturing unit (not shown in FIG. 4) can be engaged (e.g., image-capturing units located on vehicles, etc.).

The clearing house 342 may also include or be associated with a certification module 345. That is, in some cases image-capturing units may possess certain characteristics which may come into play for selecting them for engagement. Thus, a certification process can be implemented via the certification module 345, which qualifies the device for having the minimum capabilities that an image-tracking unit should have in order to be used. Such a certification module 345 can also include instructions that define the minimum amount of commands that a certified unit can interpret and operate on.

Note that the image-capturing unit clearing house 342 can also include in some embodiments, security image-capturing units or image-capturing units located on public transportation, police or private transportation along with the location. A security image-capturing unit located on private vehicles and private mobile communication devices can also be employed for searching process. Of course, it can be appreciated that this may be an optional feature. For example, owners/operators of private cameras, whether they be for home security, mounted on, for example, an RV, or Google Glass, can be offered the ability to opt out in or out any time a request comes through to use their equipment. In general, the server 310 is capable of downloading data with respect to a vehicle of interest such as, for example, vehicles of interest 302, 303, 305 shown in FIG. 3, and can selectively choose the image-capturing unit (e.g., camera 312 shown in FIG. 3) to enable in the search.

Once the image-capturing unit 312, for example, spots one of the vehicles, the authority 316 can be notified and the server 310 projects where the vehicle 302 might be going next and alerts another set of image-capturing units to look for the vehicle(s). The image-capturing units 312 can perform real time lookups since the number of vehicles for any image-capturing unit 312 at any time is relatively small. The image-capturing unit clearinghouse 342 further includes a current status and searching list 348 with respect to the detection of the vehicle of interest 302.

The dynamic search area module 352 can determine the image-capturing unit(s) 312 that needs to be engaged in the search at any one time. The dynamic search area module 352 can also calculate the area and/or radius of search 354 based on information such as, for example, the initial location, an elapsed time, and probable vehicle speeds (e.g., based on traffic conditions) while constantly monitoring results and sending data to the image-capturing unit controller 362. The trajectory processor 372 calculates the trajectory 314 of the vehicle. Once a notification goes out and module 352 calculates the trajectory 314 of the vehicle of interest, particular data can be then erased.

The image-capturing unit controller 362 can include, for example, a data transmitting receiving unit 364, a result-monitoring unit 366, and a notification unit 368. The data transmitting receiving unit 364 transmits commands to the selected image-capturing units 312 and processes feedback. The actual processing of images takes place on the image-capturing unit 312. Data that is not of interest is not stored. Data of interest is sent back to the incident management module 332 and images are stored.

Figure 5:
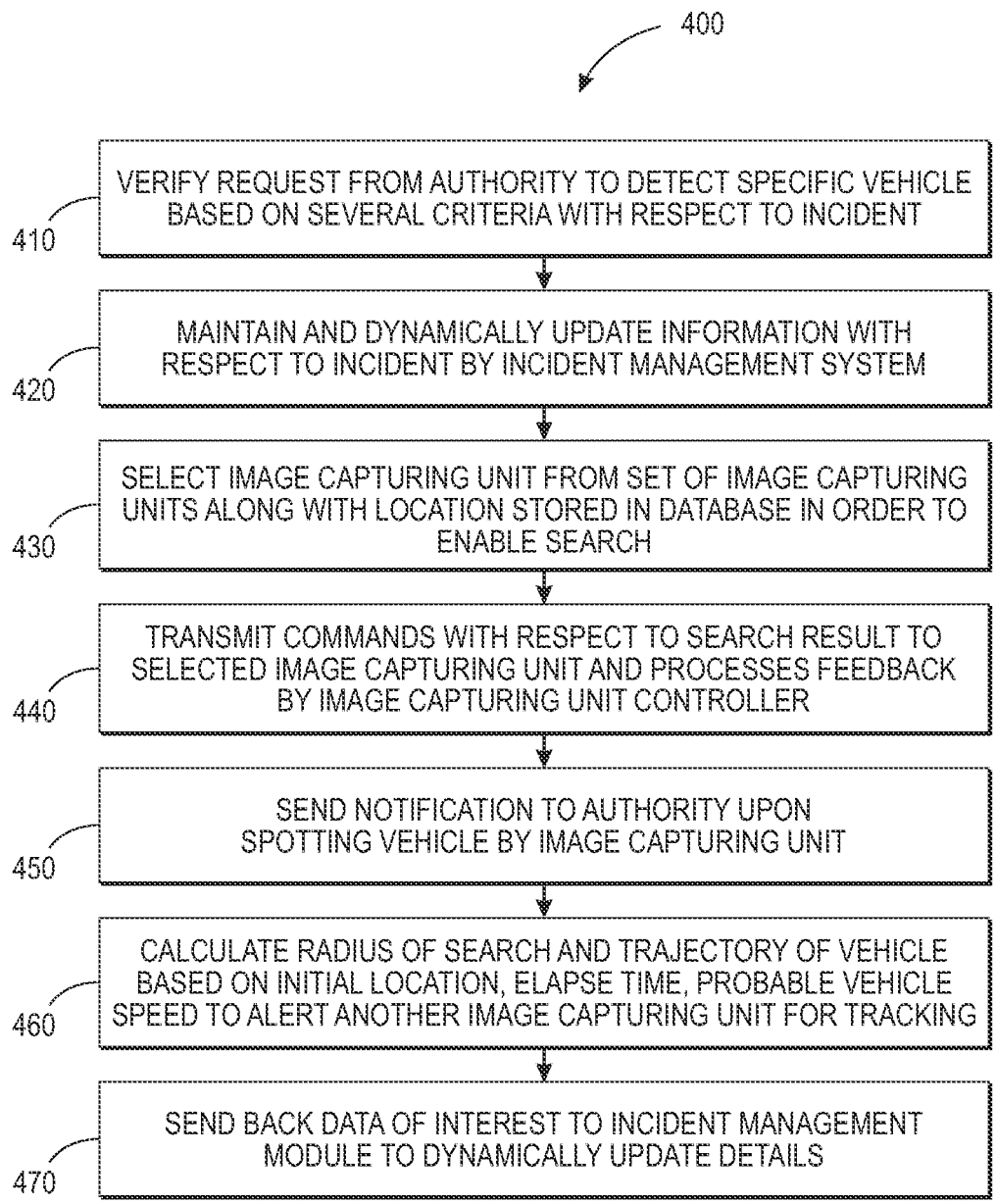
FIG. 5 illustrates a high level flow chart of operations illustrating logical operational steps of a method for detecting a vehicle of interest utilizing a traffic image-capturing unit, in accordance with the disclosed embodiments.

FIG. 5 illustrates a high level flow chart of operations illustrating logical operational steps of a method 400 for detecting vehicle of interest utilizing a traffic image-capturing unit 312, in accordance with the disclosed embodiments. It can be appreciated that the logical operational steps shown in FIG. 5 can be implemented or provided via, for example, a module such as module 152 shown in FIG. 2 and can be processed via a processor such as, for example, the processor 101 shown in FIG. 1.

Initially, as indicated at block 410, a request from the authority 316 to detect specific vehicle 302 can be verified based on, for example, several criteria. Information with respect to the incident can be maintained and dynamically updated by an incident management module 332, as illustrated at block 420. The image-capturing unit 312 can be selected from a set of image-capturing units along with the location stored in a database in order to enable a search, as indicated at block 430. The image-capturing unit controller 362 transmits commands with respect to the search result to the selected image-capturing unit 312 and processes feedback, as shown at block 440.

A notification can be sent to the authority 316 upon spotting a vehicle of interest (e.g., vehicles 302, 303, 305) by the image-capturing unit 312, as depicted at block 450. The radius and/or area of search, based on initial location, elapse time, and probable vehicle speed, can be calculated by the dynamic search area module 352 and trajectory processor 372 to alert another image-capturing unit for tracking, as described at block 460. The data of interest can be transmitted back to the incident management module 332 to dynamically update the details, as depicted at block 470.

The system 300 can include a network of image-capturing units, which can be dynamically instructed (or requested) to search for specific vehicles based on several criteria, not simply a license plate number. The dynamic search area module 352 can determine the radius or area of search 354 based upon data indicative of sightings and probable paths of the vehicle of interest. The system 300 performs immediate real time image processing at the image-capturing unit 312 rather than post processing at the server 310 and provides faster alerts to the authority 316. The searches can be performed for specific vehicles and the request can be verified. The system 300 provides higher crime solve rate, business relevance and opportunity, and extends the current transportation related services offered by ACS. The system 300 also improves image-capturing unit resolution and processing speed and increases the speed of detection and alerting mechanism.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art, which are also intended to be encompassed by the following claims.

The invention claimed is:

1. A method for detecting and tracking a vehicle of interest, said method comprising:
   verifying a request from an authority for detection of a vehicle of interest with respect to an incident based on particular criteria;
   selecting an image-capturing unit that captures an image within an effective field of view from among a plurality of image-capturing units in association with location information stored in a database, wherein said image-capturing unit is associated with a centralized server in order to enable a search with a dynamic search area algorithm and thereafter send a notification to said authority upon identifying said vehicle of interest via said image-capturing unit, said database comprising an image-capturing unit clearing house;

calculating an area of search based on an initial location comprising a location of said incident, an elapsed time, a probable vehicle speed of said vehicle of interest, and a trajectory of said vehicle of interest utilizing said dynamic search area algorithm and data generated by a trajectory processor to alert another image-capturing unit among said plurality of image-capturing units for tracking of said vehicle of interest; and dynamically updating data with respect to said incident via an incident management module to increase a detection result including a speed of detection and alerting with respect to said vehicle of interest after said calculating said area of search.

2. The method of claim 1 further comprising:

downloading data from said centralized server with respect to said vehicle of interest; and associating said image-capturing unit clearing house with a certification module that implements a certification for qualifying said image-capturing unit as a certified unit for having minimum capabilities that an image-capturing unit should possess in order to be utilized, said certification module further including instructions that define a minimum amount of commands that said certified unit can interpret and operate with.

3. The method of claim 2 the following types of data:

a fixed position with respect to a networked image-capturing unit;

a fixed position with respect to an out of network image-capturing unit comprising a privately owned image-capturing unit; and information regarding an in and out of networked mobile image-capturing unit.

4. The method of claim 2 further comprising:

performing a real time lookup as a number of vehicles for said image-capturing unit at any time is relatively small; and post processing a captured image to search an image file with respect to said vehicle of interest.

5. The method of claim 2 further comprising:

anticipating said trajectory of said vehicle of interest; and thereafter automatically erasing said trajectory of said vehicle of interest upon notifying said authority.

6. The method of claim 2 further comprising:

determining said area of search comprising a radius defining an area based upon a sighting and a probable path of said vehicle of interest;

performing image processing via said image-capturing unit to generate image data indicative of said vehicle of interest; and transmitting said data to a controller associated with said image-capturing unit.

7. The method of claim 2 further comprising constantly monitoring said detection result to improve a resolution and processing speed with respect to said image-capturing unit; and tracking at least one passenger in said vehicle of interest with a facial and/or body detection module.

8. A system for detecting and tracking a vehicle of interest, said system comprising:

a processor; and a computer-usable medium embodying computer program code, said computer-usable medium capable of communicating with the processor, said computer program code comprising instructions executable by said processor and configured for:

verifying a request from an authority for detection of a vehicle of interest with respect to an incident based on particular criteria;

selecting an image-capturing unit that captures an image within an effective field of view from among a plurality of image-capturing units in association with location information stored in a database, wherein said image-capturing unit is associated with a centralized server in order to enable a search with a dynamic search area algorithm and thereafter send a notification to said authority upon identifying said vehicle of interest via said image-capturing unit, said database comprising an image-capturing unit clearing house;

calculating an area of search based on an initial location comprising a location of said incident, an elapsed time, a probable vehicle speed of said vehicle of interest, and a trajectory of said vehicle of interest utilizing said dynamic search area algorithm and data generated by a trajectory processor to alert another image-capturing unit among said plurality of image-capturing units for tracking of said vehicle of interest; and dynamically updating data with respect to said incident via an incident management module to increase a detection result including a speed of detection and alerting with respect to said vehicle of interest after said calculating said area of search.

9. The system of claim 8 wherein said instructions are further configured for:

downloading data from said centralized server with respect to said vehicle of interest; and associating said image-capturing unit clearing house with certification module that implements a certification for qualifying said image-capturing unit as a certified unit for having minimum capabilities that an image-capturing unit should possess in order to be utilized, said certification module further including instructions that define a minimum amount of commands that said certified unit can interpret and operate with.

10. The system of claim 9 wherein said database includes data indicative of the following types of data:

a fixed position with respect to a networked image-capturing unit;

a fixed position with respect to an out of network image-capturing unit comprising a privately owned image-capturing unit; and information regarding an in and out of networked mobile image-capturing unit.

11. The system of claim 9 wherein said instructions are further configured for:

performing a real time lookup as a number of vehicles or said image-capturing unit at any time is relatively small; and post processing a captured image to search an image file with respect to said vehicle of interest.

12. The system of claim 9 wherein said instructions are further configured for:

anticipating said trajectory of said vehicle of interest; and thereafter automatically erasing said trajectory of said vehicle of interest upon notifying said authority.

13. The system of claim 12 wherein said instructions are further configured for:

determining said area of search comprising a radius defining an area based upon a sighting and a probable path of said vehicle of interest;

performing image processing via said image-capturing unit to generate image data indicative of said vehicle of interest; and transmitting said data to a controller associated with said image-capturing unit.

14. The system of claim 12 wherein said instructions are further configured for constantly monitoring said detection result to improve a resolution and processing speed with respect to said image-capturing unit; and tracking at least one passenger in said vehicle of interest with a facial and/or body detection module.

15. A non-transitory processor-readable medium storing code representing instructions to cause a process for detecting and tracking a vehicle of interest, said code comprising code to:

verify a request from an authority for detection of a vehicle of interest with respect to an incident based on particular criteria;

select an image-capturing unit that captures an image within an effective field of view from among a plurality of image-capturing units in association with location information stored in a database, wherein said image-capturing unit is associated with a centralized server in order to enable a search with a dynamic search area algorithm and thereafter send a notification to said authority upon identifying said vehicle of interest via said image-capturing unit, said database comprising an image-capturing unit clearing house;

calculate an area of search based on an initial location comprising a location of said incident, an elapsed time, a probable vehicle speed of said vehicle of interest, and a trajectory of said vehicle of interest utilizing said dynamic search area algorithm and data generated by a trajectory processor to alert another image-capturing unit among said plurality of image-capturing units for tracking of said vehicle of interest to alert another image-capturing unit for tracking of said vehicle of interest; and dynamically update data with respect to said incident vial an incident management module to increase a detection result including a speed of detection and alerting with respect to said vehicle of interest after said calculating said area of search.

16. The processor-readable medium of claim 15 wherein said code further comprises code to:

download data from said centralized server with respect to said vehicle of interest; and associate said image-capturing unit clearing house with a certification module that implements a certification for qualifying said image-capturing unit as a certified unit for having minimum capabilities that an image-capturing unit should possess in order to be utilized, said certification module further including instructions that define a minimum amount of commands that said certified unit can interpret and operate with.

17. The processor-readable medium of claim 16 wherein said database includes data indicative of the following types of data:

a fixed position with respect to a networked image-capturing unit;

a fixed position with respect to an out of network image-capturing unit comprising a privately owned image-capturing unit; and information regarding an in and out of networked mobile image-capturing unit.

18. The processor-readable medium of claim 15 wherein said code further comprises code to:

perform a real time lookup as a number of vehicles for said image-capturing unit at any time is relatively small; and post process a captured image to search an image file with respect to said vehicle of interest.

19. The processor-readable medium of claim 16 wherein said code further comprises code to:

anticipate said trajectory of said vehicle of interest; and thereafter automatically erase said trajectory of said vehicle of interest upon notifying said authority.

20. The processor-readable medium of claim 17 wherein said code further comprises code to:

determine said area of search comprising a radius defining an area based upon a sighting and a probable path of said vehicle of interest;

perform image processing via said image-capturing unit to generate image data indicative of said vehicle of interest; and transmit said data to a controller associated with said image-capturing unit.

* * * * *